March 15, 1960   D. A. BERLINCOURT ET AL   2,928,163
POLARIZATION OF TITANATE CERAMICS
Filed Aug. 11, 1955   2 Sheets-Sheet 1
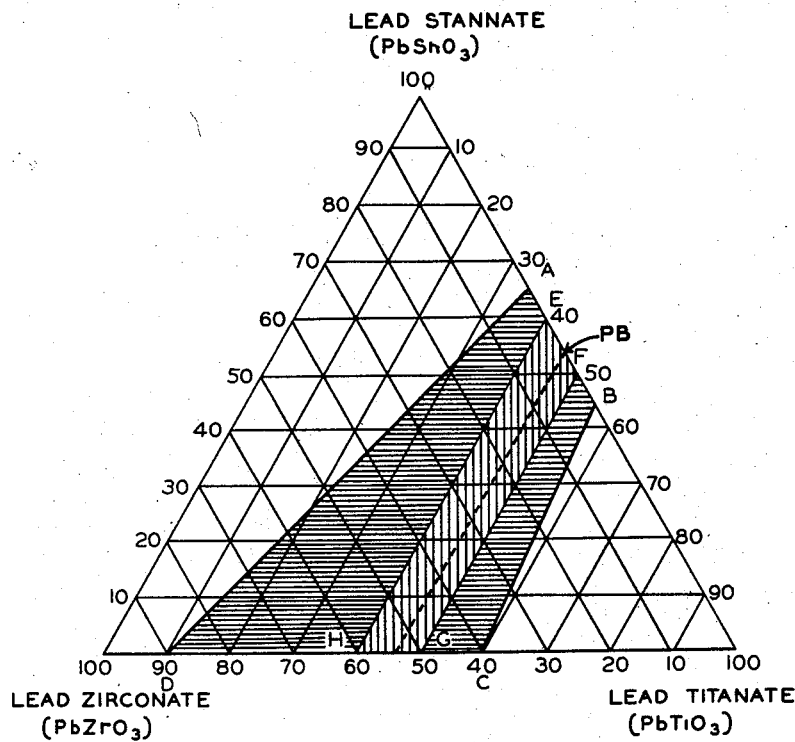
FIG.1
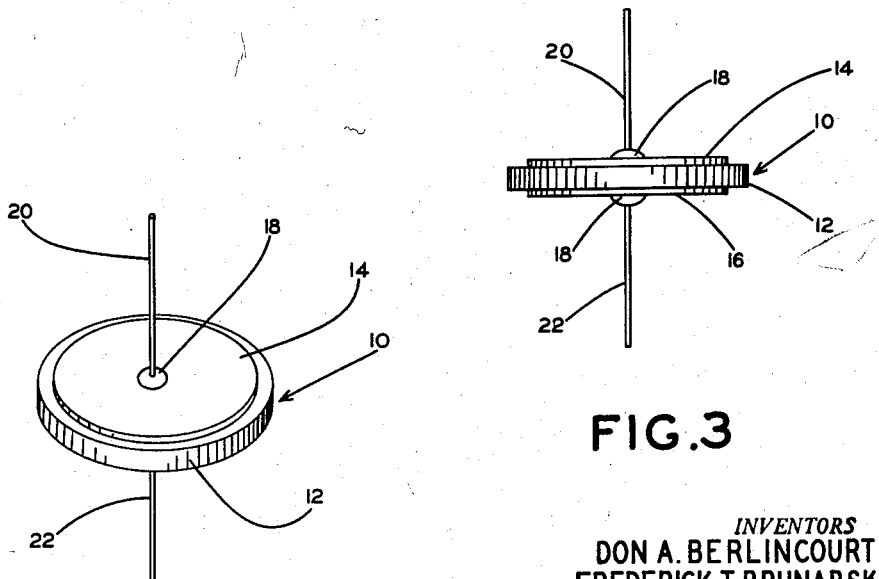
FIG.2
FIG.3
INVENTORS
DON A. BERLINCOURT
FREDERICK T. BRUNARSKI
BY
ATTORNEY March 15, 1960   D. A. BERLINCOURT ET AL   2,928,163
POLARIZATION OF TITANATE CERAMICS
Filed Aug. 11, 1955   2 Sheets-Sheet 2

INVENTORS
DON A. BERLINCOURT
FREDERICK T. BRUNARSKI
BY
ATTORNEY

2,928,163
POLARIZATION OF TITANATE CERAMICS

Don A. Berlincourt, Chagrin Falls, and Frederick T. Brunarski, Cleveland, Ohio, assignors to Clevite Corporation, Cleveland, Ohio, a corporation of Ohio Application August 11, 1955, Serial No. 527,712

3 Claims. (Cl. 29—25.35)

This invention relates to the electrical polarization of ferroelectric ceramic materials and more particularly to methods of effecting permanent electrostatic polarization of a particular class of ceramic compositions hereinafter described in detail. Generally stated, the class of compositions to which the invention is applicable consists of lead zirconate titanate solid solutions and chemical modifications thereof wherein the basic lead zirconate titanate compositions are varied by certain additions or substitutions. For ease of reference the following system of nonmenclature will be adhered to throughout the specification and claims:

(1) Ceramics and ceramic compositions consisting essentially of lead zirconate titanate or its component oxides PbO, $ZrO_2$ and $TiO_2$, will be referred to as lead zirconate titanate or, in cases where it is necessary to emphasize a distinction, a suitable adjective such as plain, normal, unmodified or the like will be prefixed;

(2) ceramics and ceramic compositions comprising lead titanate or its component oxides and containing additions or substitutions will be referred to as modified lead zirconate titanates (even though a few of such compositions may be devoid of lead zirconate as will presently appear);

(3) the entire class of ceramics and ceramic compositions to which the invention is applicable, i.e., plain lead zirconate titanate and modified lead zirconate titanate, will be referred to as lead zirconate titanate-type materials.

The composition and properties of plain, i.e., unmodified lead zirconate titanate ceramics are disclosed in U.S. Patent No. 2,708,244, issued on May 10, 1955, to Barnard Jaffe. The ceramics consist of solid solutions of lead zirconate ($PbZrO_3$) and lead titanate ($PbTiO_3$) in various proportions as fully disclosed in the aforementioned Patent No. 2,708,244. They are characterized in their electrical properties by relatively higher Curie temperatures and better electromechanical couplings, as compared to other known ferroelectric ceramics such as barium titanate, for example. In addition to plain lead zirconate titanate as disclosed by Jaffe, other related compositions having similar chemical constituency, crystallographic structure and electrical properties have been discovered to which the present invention also applies. Certain of these related compositions, i.e., modified lead zirconate titanate compositions, are disclosed in the copending application of Frank Kulcsar et al., Serial No. 627,720, filed on even date herewith and assigned to the same assignee as the present invention. These modified compositions may be catagorized as (1) plain lead zirconate titanate with certain alkaline earth metals, viz., strontium and/or calcium, substituted for a minor fraction of the lead component and (2) further variations of the basic lead zirconate titanate compositions involving the addition and/or substitution of hafnium and/or tin for part or all of the zirconium with or without the substitutional additions of calcium and/or strontium.

It is well nown in the art that certain ferroelectric ceramics including plain lead zirconate titanate may be polarized by the application thereto of an electrostatic field. In the main this polarization is accomplished in one of two ways: either the ceramic is subjected to the poling field at room temperature or, as in the case of barium titanate ($BaTiO_3$), for example, the best effect is obtained by heating the ceramic to a temperature above its Curie point and allowing it to cool with the poling field applied. This latter method, often referred to as "hot polarization," is disclosed in U.S. Patent No. 2,486,560 to Gray.

In addition to the two basic polarizing methods mentioned above, it has recently been disclosed in U.S. Letters Patent No. 2,706,326 to W. P. Mason that potassium niobate ceramic bodies may be polarized by heating to a temperature within the range 210 to 215° C., applying a unidirectional electric field of about 9000 volts per centimeter and maintaining the field while the ceramic body is cooled substantially below the specified temperature range. In this process, the temperature range and field strength are critical and operative only with potassium niobate. The process seems very similar to the hot polarizing techniques commonly applied to barium titanate with the exception that it operates at a sub-Curie transition temperature.

In the case of the lead zirconate titanate-type compositions with which the present invention is concerned the Curie temperatures are relatively higher than $BaTiO_3$, for example, and hot polarization as normally practiced in the art is not possible. This is because, when these compositions are heated above their Curie temperatures, their electrical resistivity drops to such an extent that they become electrically conductive even under relatively low potentials, thus precluding the application of poling fields of sufficient intensity to effect any appreciable degree of polarization.

The polarizing method disclosed in Mason's aforementioned patent is likewise inapplicable to lead zirconate titanate-type ceramics because they short under the conditions of temperature and field strength required and furthermore, they do not exhibit any sub-Curie transition temperatures such as characterize potassium niobate.

In consequence of the foregoing, polarization of lead-zirconate titanate-type ceramics has heretofore, of necessity, been carried out cold, i.e., at room temperatures. While the degree of polarization attained at room temperature, as reflected by the electromechanical coupling of the polarized ceramic, is relatively high, this is in spite of rather than because of the efficacy of the poling techniques employed.

In other words, the disadvantage of cold polarization is that it does not fully exploit the inherent susceptibility to polarization of lead zirconate titanate-type ceramics, and therefore, cold-polarized bodies of these ceramics do not exhibit as high a piezoelectric activity as that of which they are potentially capable.

The present invention contemplates a novel method of polarizing ceramics which involves operation within a range of temperatures well below the Curie point of the material and operates with ferroelectric materials not characterized by sub-Curie transition points. The invention also encompasses, as an optional feature of the method, the conditioning of lead zirconate titanate-type ceramic materials by the application and reversal of the polarity of electrostatic poling fields to enable such materials to withstand polarizing fields of higher intensity and/or of longer duration. Still another feature of the invention, applicable to certain ceramic compositions hereinafter identified and falling within the category designated as lead zirconate titanate-type ceramics, is the accomplishment of a relatively permanent transformation of such compositions from a crystalline phase of one free energy level to a phase of higher free energy level.

It is, therefore, a primary object of the present invention to provide novel methods of electrically polarizing certain ferroelectric materials which avoid one or more of the disadvantages of prior art methods.

A more specific object is the provision of improved methods for electrically polarizing lead ziriconate titanate-type ceramic materials which result in a higher degree of remanent polarization and concomitantly in higher piezoelectric activity of the polarized material.

Another object of the invention is to provide a novel method of electrically polarizing certain lead zirconate titanate-type ceramic materials which involves a phase transformation of the crystal structure of the materials from a phase of lower to a phase of higher free energy level.

Still another object of the invention is to provide a method of conditioning ferroelectric ceramic materials to enable them to withstand more severe electrostatic polarizing conditions, viz., higher field strength and/or longer periods of application of polarizing fields.

Still another object of the invention is the provision of novel methods of electrostatically polarizing lead zirconate titanate-type ceramic bodies which drastically reduce the time which the polarizing field need be applied for a given degree of polarization and enables a higher degree of polarization regardless of time.

A further object of the invention is the provision of improved, polarized lead zirconate titanate-type piezoelectrically active ceramic bodies characterized by a radial electromechanical coupling coefficient of at least 40%.

A still further object of the invention is the provision of an electrically polarized polycrystalline ferroelectric lead zirconate titanate-type ceramic body, of tetragonal crystal structure in its normal or unpolarized state and at sub-Curie temperature, characterized by a predominantly rhombohedral crystal structure due to polarization.

These and ancillary objects and the manner of their accomplishment will be apparent to those conversant with the art from a reading of the following description and subjoined claims in conjunction with the annexed drawings, in which, Figure 1 is a triangular compositional diagram graphically depicting certain compositions to which the present invention is applicable;

Figure 2 is a perspective elevation of an electromechanical transducer element electroded for polarization;

Figure 3 is a side elevation of the transducer shown in Figure 2;

Figure 4:
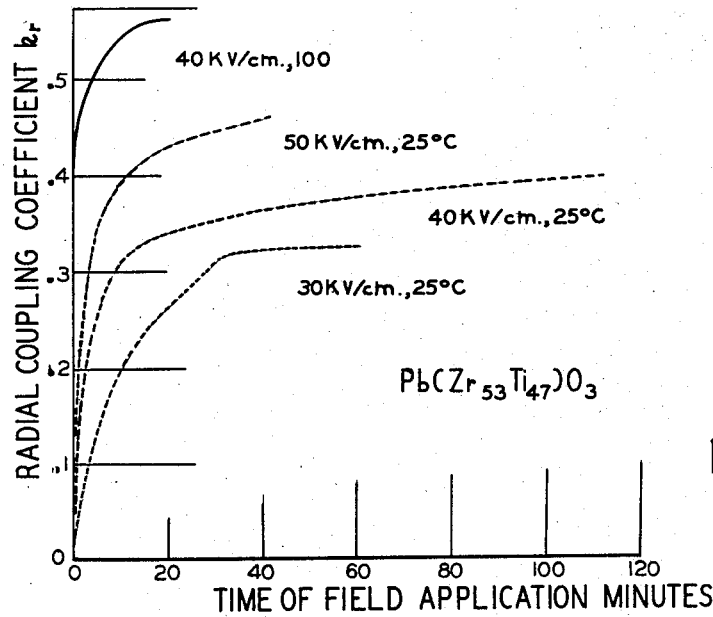
Figure 4 is a graph of values of radial coupling ($k_r$) of lead zirconate titanate ($PbZrO_3:PbTiO_3=53:47$) versus time of application of the polarizing field.

Before undertaking a description of the polarizing methods contemplated by the present invention, the ferroelectric ceramic materials to which they apply will be identified, with reference to Figure 1 of the drawing. Generally speaking these compositions are ferroelectric polycrystalline ceramics consisting principally of solid solutions of lead titanate and at least one other oxidic lead salt selected from the group consisting of lead zirconate ($PbZrO_3$), lead stannate ($PbSnO_3$) and/or lead hafnate ($PbHfO_3$) with or without additions of the alkaline earth metals strontium and/or calcium in substantial amounts as hereinafter set forth. Inasmuch as hafnium frequently occurs as an impurity in varying amounts in zirconium and because of the similarity of these two elements in the ceramic compositions under discussion, they may be considered substantial equivalents and interchangeable. Furthermore, for convenience of description and because the high cost of hafnium as compared to the remaining constituents renders its use on a large scale uneconomic in commercial production of the ceramics in question, the presence of hafnium will be disregarded in the ensuing description with the understanding that it constitutes an operative variation in and falls within the scope of the invention.

Thus it will be seen that, disregarding for the moment the optional alkaline earth metal additions strontium and calcium, the basic compositions with which the present invention is concerned falls into three categories: those belonging to (1) the binary system $PbZrO_3$—$PbTiO_2$, (2) the binary system $PbSnO_3$—$PbTiO_3$, and (3) the ternary system $PbZrO_3$—$PbTiO_3$—$PbSnO_3$. All possible compositions coming within all three of these systems are represented by the triangular diagram of Figure 1 of the drawings. All compositions, falling within the diagram, however, are not ferroelectric (and therefore not susceptible to polarization) and many are electromechanically active only to a slight degree.

The present invention is concerned only with those compositions capable of substantial piezoelectric response after polarization. As a matter of convenience, the radial coupling $k_r$ (also known as the planar coupling, $k_p$, or disc coupling $k_{disc}$) of test discs will be used as a measure of piezoelectric activity.

Referring to Figure 1, the present invention is applicable to compositions falling within the horizontally hatched area ABCD including binary $PbZrO_3$—$PbTiO_3$ compositions falling on line DC with mol ratios ($PbZrO_3:PbTiO_3$) of the end components in the range 90:10 to 40:60 and binary $PbSnO_3$—$PbTioO_3$ compositions on line AB with mol ratios $PbSnO_3:PbTiO_3$) of the end components in the range 65:35 to 45:55. The preferred compositions fall within the smaller, vertically hatched area EFGH of the diagram and lie in relatively close proximity to a phase boundary represented approximately by broken line "PB" of the diagram. According to one feature of the present invention, a metastable transformation of the crystal structure of certain compositions within area EFGH is accomplished, as will hereinafter be more fully explained, which is accompanied by an even greater increase in and higher peak values of piezoelectric response of the polarized ceramic body.

In addition to the ceramic compositions described above in conjunction with the Figure 1 diagram, the invention is generally applicable with equal advantage to compositions within area ABCD including, as substituents for a part of the lead, up to about 30 atom percent in the aggregate of the alkaline earth metals calcium and/or strontium. However, the transformation alluded to above can be accomplished only when these are present in quantities of no greater than about 5 atom percent.

Further details of the ceramic compositions described above, including methods of compounding and firing, may be had by reference to the above mentioned concurrently filed application Serial No. 527,720 and U.S. Letters Patent No. 2,708,244.

The preferred application of the present invention is to lead zirconate-lead titanate compositions with mol ratios in the range from 60:40 to 50:50, i.e., the compositions on line HG of the diagram of Figure 1, and containing up to about 15% strontium substituted for an equal amount of lead on an atom basis. Accordingly, but solely for purposes of example, the remainder of this description will deal principally with these preferred compositions.

Referring now to Figures 2 and 3, there is illustrated and designated generally by reference numeral 10, a body of ceramic material, such as above described, electroded for polarization. In this examplary embodiment, the ceramic body takes the form of a disc 12 which is provided with a pair of electrodes 14 and 16, applied in any suitable manner, on two opposed surfaces thereof. Conductively attached to the electrodes 14 and 16, as by a solder 18, are respective wire leads 20 and 22 across which a polarizing D.C. voltage from a suitable source (not shown) is impressed.

According to the present invention polarization of ceramic disc 12, of the specified compositions, is accomplished by heating the disc, as by immersion in a heated liquid such as oil, to a temperature within the range 50° to 150° C. and applying across electrodes 14 and 16 a D.C. voltage of approximately 30 to 50 or 60 thousand volts per centimeter of thickness of the disc, i.e., the distance between electrodes. The preferred conditions applicable to the preferred lead zirconate titanate-type compositions are 40 thousand volts per centimeter at a temperature of about 100° C. The length of time the field is applied may be as brief as 10 or 15 seconds, which in most cases is sufficient to achieve a substantially higher degree of polarization than possible in nearly two hours or poling with the same field strength according to conventional "cold" poling techniques. This comparison is graphically presented in Figure 4 which is a graph of radial coupling coefficient ($k_r$) versus time of field application and will be discussed presently. Ordinarily, the field is applied until substantially complete saturation of polarization at the particular temperatures occurs or until the disc shows evidence of rapidly increasing conductivity. The optimum time, temperature, and field strength for a particular composition can be determined empirically on the basis of the present disclosure. Generally, the field strength required will be somewhat lower than and the time of application a very small fraction of that used in cold poling. Furthermore, in the method of the invention it has been found that, within the ranges specified above, the combination of a relatively higher temperature and lower field strength is usually more satisfactory than a relatively lower temperature and stronger field.

Above 150° C., the resistivity of the ceramic becomes too low and thus precludes application of fields of sufficient strength; below 50° C. the mobility of the electric domains is too low to allow any appreciable gain in polarization over that resulting from conventional (i.e., cold poling) techniques.

Once the polarizing field has been applied for the appropriate length of time the polarizing is complete, unless difficulty is encountered in the form of conduction before saturation. This eventuality will be considered hereinafter in conjunction with a description of another feature of this invention which overcomes this difficulty. In the absence of conduction or shorting, however, polarization is completed with the application of the field for the desired duration. It is not necessary to raise or lower the temperature of the ceramic body with the field applied although variations in temperature of the body during the field application are not detrimental.

Referring once again to Figure 4, the radial coupling coefficient, $k_r$, which, other factors (e.g., composition) being equal, is a measure of the degree of polarization is plotted against time of field application. All curves are for the same ceramic composition, viz., plain lead zirconate titanate with the $PbZrO_3:PbTiO_3$ mol ratio equal to 53:47. The broken line curves are for discs poled according to conventional procedures, specifically at 25° C. with field strengths of 30, 40, and 50 kv. per cm., respectively, as indicated thereon, while the solid line curve is for discs polarized in a field of 40 kv. per cm. at 100° C. While the great difference in the time required for poling as between specimens at 25° C. and 100° C. does not permit the use, within the space limitations, of an abscissa scale satisfactorily accommodating all curves, it will be readily apparent that specimens poled according to the method of the present invention (solid line curve) reached a much higher coupling (nearly 0.55) in one half the time required for conventional poling techniques even where such techniques employed a 20% higher field strength. As a matter of fact, the specimens poled according to the present invention in one minute (not readable on the curve) reached a coupling of nearly 0.45 which is as high as the specimen poled at 25° C. with 50 thousand volts per centimeter reached in 40 minutes at which time shorting occurred.

Figure 5:
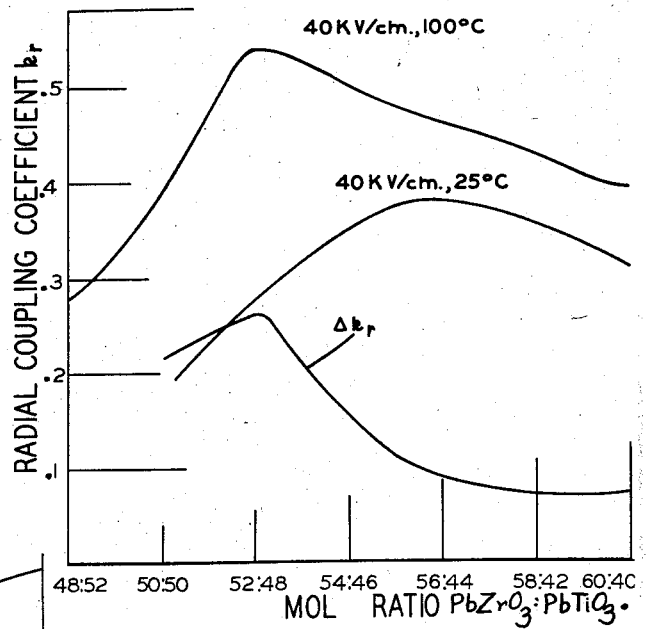
Figure 5 is a graph showing the variation of radial coupling ($k_r$) of lead zirconate titanate with the ratio $PbZrO_3:PbTiO_3$ when poled (1) according to the present invention and (2) when poled by conventional ("cold" poling) techniques.

Referring now to Figure 5, there is shown the effect of varying $PbZrO_3:PbTiO_3$ mol ratios on the radial coupling coefficients exhibited by samples of lead zirconate titanate polarized according to the present invention, specifically at 100° C. with a field of 40 thousand volts per centimeter, and by conventional (cold) poling techniques, i.e., 25° C. at 40 kv. per cm. Also plotted is a curve representing the arithmetic difference in coupling coefficient between the two methods of polarization.

From these curves it will be seen that not only is there a marked general improvement in radial couplings of lead zirconate titanate ceramics poled according to the present invention over identical compositions poled according to standard techniques, but also that there are higher peak values and greater improvements in coupling in compositions having $PbZrO_3:PbTiO_3$ mol ratios around 52:48 and 53:47. This phenomena is believed to be due to a metastable transformation of the crystal structure of such compositions as will now be explained with reference to Figure 6, showing a simplified phase diagram of lead zirconate titanate ceramics which is representative of the types of ceramics to which the present invention applies.

Lead zirconate titanate-type ceramics are characterized by a perovskite or pseudocubic crystal structure. From the diagram of Figure 6, the major phase variations with temperature and composition will be readily apparent: above the Curie temperature the crystal structure is cubic; below the Curie temperature, the crystal structure depends on the mol ratio $PbZrO_3:PbTiO_3$ giving rise to an approximately vertical phase boundary PB' at or near the composition ratio 54:46. When the mol percentage of $PbZrO_3$ of the composition exceeds 54, the crystal structure is rhombohedral; with lower percentages of $PbZrO_3$, the crystal structure becomes tetragonal. At equal percentage-wise distances from the phase boundary the rhombohedral phase is characterized by higher planar couplings as compared to compositions of tetragonal symmetry. As shown by the curve marked $\Delta k_r$, Figure 5, the greatest improvement in coupling upon polarization in accordance with the invention, as compared to cold poling, is noted among compositions adjacent to, i.e., within about 3 mol percent of the phase boundary and normally (before poling) on the tetragonal side. It is believed that, among such compositions, a metastable phase transformation is accomplished by the poling method disclosed herein causing a change in crystal symmetry from tetragonal toward rhombohedral. Thus, by polarization under the conditions specified, certain compositions normally of tetragonal crystal symmetry are transformed at least partially to rhombohedral with a concomitant increase in planar coupling over and above that accomplished by the method of this invention applied to the compositions in general.

Figure 6:
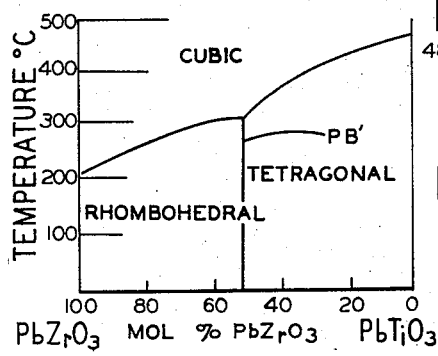
Figure 6 is a simplified and stereotyped phase diagram roughly approximating and representing typical diagrams of the compositions to which the present invention applies.

The phase boundary PB' of Figure 6, finds its counterpart for ternary systems $PbZrO_3$—$PbTiO_3$—$PbSnO_3$ in phase boundary PB of Figure 1. The compositions capable of this metastable phase transformation are those close to (within about 3 mole percent) and on the tetragonal side of the phase boundary. The occurrence of the transformation has been substantiated by the following procedure. First an X-ray diffraction pattern was taken on a polished disc, unpolarized, of various compositions near the normal (prepolarized) phase boundary ($PbZrO_3:PbTiO_3=54/46$). The discs were then subjected to a D.C. field of about 40 kv. cm. for four minutes at 100° C., in accordance with the present invention and another X-ray diffraction pattern taken. The results are given in the following tabulation wherein "R" represents rhombohedral symmetry, "T" represents tetragonal, and the stronger or predominant phase is underscored:

| Composition $PbZrO_3:PbTiO_3$ | Before Polarization | After Polarization |
|---|---|---|
| 52:48 | T | T+R |
| 53:47 | T | R+minor T |
| 54:46 | R+T | R+minor T |

From the above tabulation it will be appreciated that there is a definite shift toward the rhombohedral symmetry phase.

It has been mentioned above in connection with the time of field application in polarizing according to this invention, that the field is applied until saturation of the polarization or until conduction occurs. Depending on the identity of the composition and the polarizing conditions employed conduction sometimes occurs, early or late, but before optimum polarization is accomplished. Conduction precludes further effective poling because it then becomes impossible to maintain an effective field strength without causing breakdown and shorting of the element being poled. In accordance with another feature of the present invention, ceramic materials of the specified type can be conditioned to withstand more intensive polarization, i.e., either a higher voltage, poling at a higher temperature, a longer period of poling, or a combination of two or more of these factors. Generally stated, this conditioning is accomplished by reversal of the polarity of the poling field. The conditioning by reversal of the poling field is beneficial, not only where conduction or shorting is a problem but also results in higher planar couplings in specimens which do not conduct or short under a field applied in one direction only.

Referring to the polarity of the poling field as "forward" and "reverse" rather than positive or negative, the poling method is carried out as hereinabove described for a predetermined period or until conduction occurs whereupon the polarity of the field is reversed and the field applied again for a predetermined period or until conduction occurs. The process may be repeated until the specimen exhibits a satisfactory planar coupling or until no further gain in coupling is observed.

The following tabulation sets forth examples of the increased electromechanical response characterizing specimens of PZT ($PbZrO_3:PbTiO_3=53:47$) subjected to reversed field polarization.

| Specimen No. | $k_p$ (after 4 minutes' poling in one direction at 40 kv./cm. 100° C.) | $k_p$ (after 4 minutes' reversed poling at 40 kv./cm., 100° C.) |
|---|---|---|
| 1 | .465 | .502 |
| 2 | .466 | .505 |
| 3 | .471 | .511 |
| 4 | .475 | .503 |
| 5 | .484 | .521 |
| 6 | .488 | .518 |
| 7 | .487 | .521 |
| 8 | .496 | .531 |

It appears that, in general, the beneficial effects of reversal of the poling field is more pronounced when the field application in any given direction is continued to conduction.

For example, one specimen of 53:47 PZT would initially withstand 40 kv. per cm. at 100° C. only instantaneously. It then conducted freely until the field was lowered to about 10 kv. per cm. After a number of reversals of the poling field, the specimen withstood a field of 60 kv. per cm. for 8 minutes before conduction and 24 hours after poling had a planar coupling of .627.

From the foregoing description it will be appreciated that the present invention fulfills its objects in providing methods for more effectively polarizing lead zirconate titanate-type compositions in a much shorter period of time, for effecting a metastable phase transformation of certain of said compositions and for conditioning such compositions to withstand and accept higher degrees of polarization.

While there have been described what are at present considered to be the preferred embodiments of this invention, it will be obvious to those skilled in the art that various changes and modifications can be made therein without departing from the invention, and it is aimed, therefore, in the appended claims to cover all such changes and modifications as fall within the true spirit and scope of the invention.

What is claimed is:

1. A method of effecting permanent electrostatic polarization of a ferroelectric ceramic body composed essentially of a solid solution of oxidic lead salts selected from area EFGH of the Figure 1 diagram and containing, as substituents for an equivalent amount of the lead on an atom basis up to about 30 percent in the aggregate of at least one alkaline earth metal selected from the group consisting of calcium and strontium, comprising: heating the ceramic body to a temperature within the range 50° to 150° C.; applying to said body, while in said temperature range, a unidirectional electrostatic field of at least about 30,000 volts per centimeter for a preselected period of time not exceeding the time required for conduction through the body to occur; reversing the polarity of the applied field and continuing its application for another preselected period of time not exceeding the time required for conduction through the body to occur; and continuing the applications of fields of alternately reversed polarity until substantial saturation of the polarization of said body at said temperature has been accomplished.

2. The method defined in claim 1 wherein the application of said unidirectional electrostatic field is continued until conduction occurs whereupon the polarity of the polarizing field is reversed.

3. A method of conditioning ferroelectric ceramic bodies to withstand more severe electrostatic polarizing before breakdown and shorting than in the unconditioned state comprising the steps of applying to said bodies a unidirectional electrostatic polarizing field of preselected polarity; continuing the application of said polarizing field for a given period of time not longer than the time required for conduction through the bodies to take place; discontinuing the application of said polarizing field and applying to said bodies a second unidirectional electrostatic polarizing field, of opposite polarity with respect to said first mentioned field; continuing the application of the second mentioned polarizing field for a given period of time not longer than the time required for conduction through the bodies to take place; and repetitively alternately applying said first and second mentioned fields until the desired polarization is attained.

References Cited in the file of this patent

UNITED STATES PATENTS

| 2,384,541 | Fruth | Sept. 11, 1945 |
| 2,538,554 | Cherry | Jan. 16, 1951 |
| 2,659,829 | Baerwald | Nov. 17, 1953 |
| 2,708,244 | Jaffe | May 10, 1955 |

FOREIGN PATENTS

| 643,448 | Great Britain | Sept. 20, 1950 |

UNITED STATES PATENT OFFICE
CERTIFICATE OF CORRECTION

Patent No. 2,928,163                              March 15, 1960

Don A. Berlincourt et al.

It is hereby certified that error appears in the printed specification of the above numbered patent requiring correction and that the said Letters Patent should read as corrected below.

Column 1, line 44, for "Barnard" read -- Bernard --; line 60, for "627,720" read -- 527,720 --; column 2, line 57, after "polarizing" insert -- lead zirconate titanate-type --; column 4, line 36, for "PbSnO$_3$:PbTiO$_3$)" read -- (PbSnO$_3$:PbTiO$_3$) --; column 5, line 62, for "in a" read -- is a --; column 7, in the table, third column thereof, under the heading "After Polarization", first line, for "T+R" read -- $\underline{T}$+R --; same table, second column thereof, under the heading "Before Polarization", third line, for "R+T" read -- $\underline{R}$+T --.

Signed and sealed this 6th day of September 1960.

(SEAL)
Attest:

ERNEST W. SWIDER                        ROBERT C. WATSON
Attesting Officer                      Commissioner of Patents